(12) United States Patent
Rose

(10) Patent No.: US 9,342,270 B2
(45) Date of Patent: May 17, 2016

(54) CONVERSION OF A NORMALIZED N-BIT VALUE INTO A NORMALIZED M-BIT VALUE

(71) Applicant: Imagination Technologies Limited, Kings Langley (GB)

(72) Inventor: Thomas Rose, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 398 days.

(21) Appl. No.: 13/804,110

(22) Filed: Mar. 14, 2013

(65) Prior Publication Data

US 2014/0280405 A1    Sep. 18, 2014

(51) Int. Cl.
*G06F 7/499* (2006.01)
*G06F 5/01* (2006.01)

(52) U.S. Cl.
CPC .............. *G06F 7/49936* (2013.01); *G06F 5/01* (2013.01); *G06F 7/49947* (2013.01)

(58) Field of Classification Search
CPC .................................................. G06F 7/49947
USPC .................................................. 708/496, 204
See application file for complete search history.

(56) References Cited

U.S. PATENT DOCUMENTS 5,404,324 A * 4/1995 Colon-Bonet ................ 708/650
2007/0162535 A1 * 7/2007 Wait .............................. 708/497

OTHER PUBLICATIONS

Windows, Data Conversion Rules, Jan. 14, 2012, pp. 1-5.*

* cited by examiner

*Primary Examiner* — Andrew Caldwell
*Assistant Examiner* — Calvin M Brien
(74) *Attorney, Agent, or Firm* — Vorys, Sater, Seymour and Pease LLP; Vincent M DeLuca

(57) ABSTRACT

A normalized n-bit value is converted into a normalized m-bit value in accordance with a predetermined rounding mode. An initial m-bit value is determined, where the bits of the initial m-bit value are equal to the m most significant bits of a concatenation of one or more copies of a group of one or more bits derived from the normalized n-bit value. An output state is selected based on bits of the normalized n-bit value and in accordance with the predetermined rounding mode. The output state indicates how the normalized m-bit value is to be determined from the initial m-bit value. In accordance with the selected output state, the normalized m-bit value is determined to be equal to one of a plurality of candidate m-bit values, wherein the plurality of candidate m-bit values consists of the initial m-bit value and at least one of: (i) the initial m-bit value incremented by one, and (ii) the initial m-bit value decremented by one.

20 Claims, 10 Drawing Sheets

CONVERSION OF A NORMALIZED N-BIT VALUE INTO A NORMALIZED M-BIT VALUE

BACKGROUND

Data for use by a processing unit typically comprises a number of bits. Data values can be represented by bits according to a number of different formats. For example, data values may be normalized data values which represent a number within a particular range. For example, a number may be represented using an n-bit UNORM value which is an unsigned normalized integer representing $2^n$ evenly spaced values between and including 0 and 1. For example, 0 is represented by an n-bit UNORM value with all n bits being zero, and 1 is represented by an n-bit UNORM value with all n bits being one.

As another example, a number may be represented using an n-bit SNORM value which is a signed normalized integer. The maximum signed n-bit value represents +1 whilst the minimum signed n-bit value represents −1. In addition the second-minimum signed n-bit value also represents −1 such that there are two representations for −1. This results in a set of integer representations for evenly spaced values in the range −1 to 0, and also a complementary set of representations for evenly spaced values in the range 0 to 1.

As described above, an n-bit UNORM value is an unsigned n-bit integer, x, interpreted as representing a number given by:

$$\frac{x}{2^n - 1}.$$

Since the UNORM value, x, is an integer, only particular numbers within the range from 0 to 1 can be represented. For example, for a 2-bit UNORM value, the bits '00' represent 0, the bits '01' represent ⅓, the bits '10' represent ⅔ and the bits '11' represent 1. It can be appreciated, for example, that there is no n-bit UNORM value which exactly represents ½. Furthermore, it can be shown that there is no n-bit UNORM value which represents a value exactly halfway between the values represented by two consecutive m-bit UNORM values.

A normalized n-bit value may be converted into a normalized m-bit value, where n≠m. A conversion such as this may be used by a processing unit acting on the data for one of many different reasons as would be apparent to a person skilled in the art.

An m-bit UNORM value is an unsigned m-bit integer, y, interpreted as representing a number given by:

$$\frac{y}{2^m - 1}.$$

Therefore, the m-bit UNORM value, y, which corresponds to the n-bit UNORM value, x, is given by:

$$y = \frac{2^m - 1}{2^n - 1} x. \quad (1)$$

However, according to the UNORM data format, the m-bit UNORM value, y, must be an integer, so equation (1) shown above may require some rounding in order to find an integer value for y. Different rounding techniques may be used, such as round to zero (RTZ), round to positive infinity (RTP), round to negative infinity (RTN) and round to the nearest integer (e.g. RTE which is round to nearest, ties to even; or RTU which is round to nearest, ties to upper).

One way to calculate the value of y in accordance with equation (1) is to perform a multiplication operation to multiply x by $(2^m-1)$, then to perform an addition operation to add a constant for the purposes of rounding and then to perform a division operation to divide the result by $(2^n-1)$. These operations tend to give a reliable result for the value of y, but there may be a cost in terms of the silicon area and processing power, as well as the time taken to compute y by implementing these operations. Optimized implementations for performing the division operation are available.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method in which a normalized n-bit value is converted into a normalized m-bit value in accordance with a predetermined rounding mode. An initial m-bit value is determined, where the bits of the initial m-bit value are determined to be equal to the m most significant bits of a concatenation of one or more copies of a group of one or more bits derived from the normalized n-bit value. For example, the bits of said initial m-bit value may be determined to be equal to the m most significant bits of a concatenation of $$\lceil \frac{m}{n} \rceil$$

copies of the received normalized n-bit value. An output state is selected based on bits of the normalized n-bit value and in accordance with the predetermined rounding mode. The output state indicates how the normalized m-bit value is to be determined from the initial m-bit value. In accordance with the selected output state, the normalized m-bit value is determined to be equal to one of a plurality of candidate m-bit values, wherein the plurality of candidate m-bit values consists of the initial m-bit value and at least one of: (i) the initial m-bit value incremented by one, and (ii) the initial m-bit value decremented by one.

The conversion of the normalized n-bit value into a normalized m-bit value may be implemented in logic. The logic may be implemented on a processing unit.

The output state may be selected by determining a value of a subtraction of a first arrangement of the bits of the normalized n-bit value from a second arrangement of the bits of the normalized n-bit value. For example, the first arrangement may be equal to the n bits of the normalized n-bit value, and the second arrangement may be equal to n bits comprising the r most significant bits of the normalized n-bit value appended to the n−r least significant bits of the normalized n-bit value, where r=m mod n. The sign of the result of the subtraction may be determined, e.g. using an (n−k)-bit subtractor acting on the (n−k) most significant bits, where k is the greatest common divisor of n and m.

To give examples, the predetermined rounding mode may be a rounding mode in which non-integer values are rounded down to the next integer (e.g. RTZ or RTN rounding modes). In this case, the plurality of candidate m-bit values may consist of the initial m-bit value and the initial m-bit value decremented by one. Alternatively, the predetermined rounding mode may be a rounding mode in which non-integer values are rounded up to the next integer (e.g. RTP). In this case, the plurality of candidate m-bit values may consist of the initial m-bit value and the initial m-bit value incremented by one. As another alternative, the predetermined rounding mode may be a rounding mode in which non-integer values are rounded to the nearest integer (e.g. RTE). In this case, the plurality of candidate m-bit values may consist of the initial m-bit value, the initial m-bit value incremented by one and the initial m-bit value decremented by one.

The above features may be combined as appropriate, as would be apparent to a skilled person, and may be combined with any of the aspects of the examples described herein.

BRIEF DESCRIPTION OF THE DRAWINGS

Examples will now be described in detail by way of reference to the accompanying drawings in which.

Figure 1:
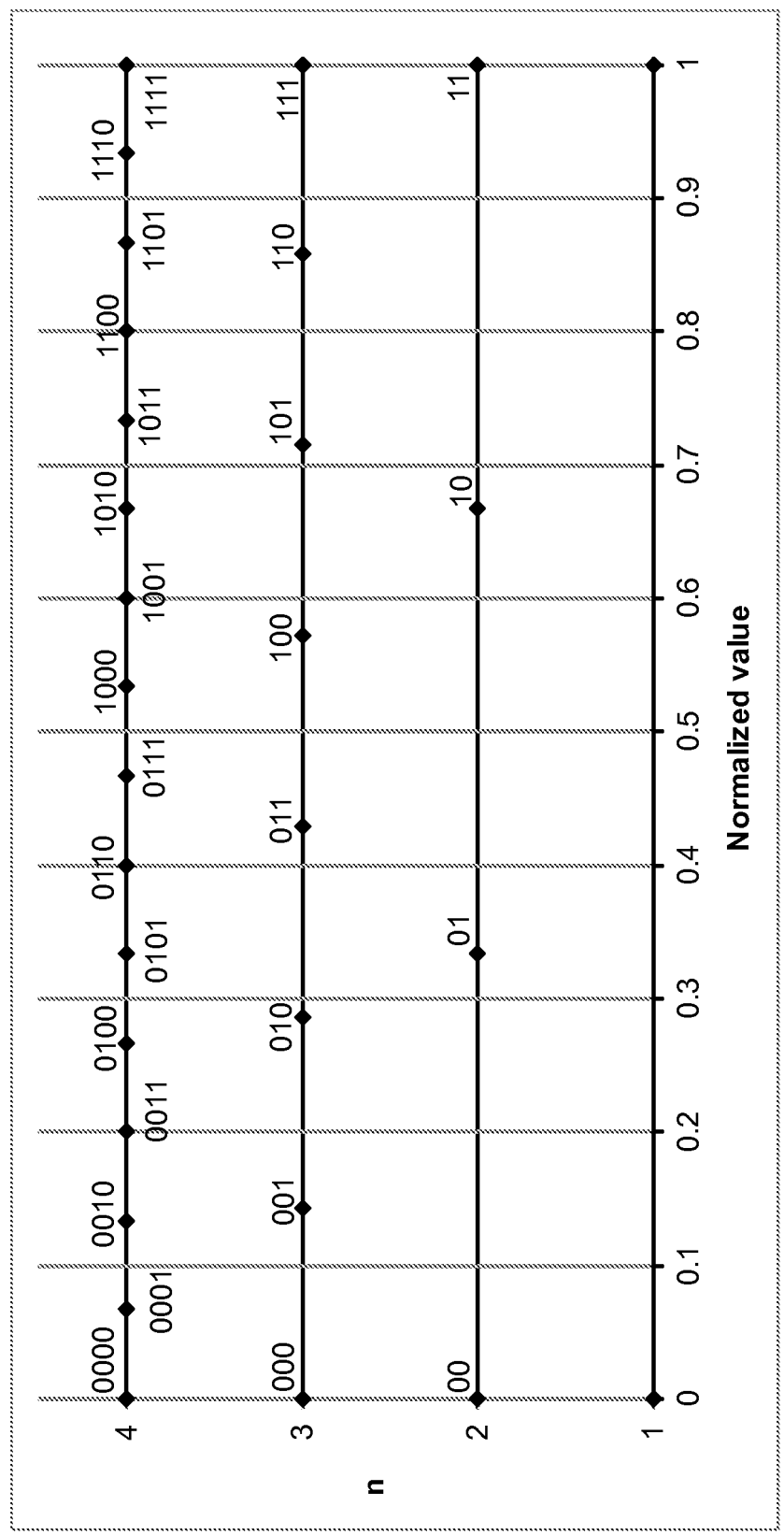
FIG. 1 is an illustration of numbers which can be represented by n-bit UNORM data values for some different values of n.

Common reference numerals are used throughout the figures, where appropriate, to indicate similar features.

DETAILED DESCRIPTION

Embodiments will now be described by way of example only.

As described above, an n-bit UNORM value is an unsigned n-bit integer, x, interpreted as representing a number given by:

$$\frac{x}{2^n - 1}.$$

FIG. 1 is an illustration of numbers which can be represented by n-bit UNORM data values for values of n from 1 to 4. It is for clarity that FIG. 1 does not show the numbers which can be represented by UNORM data values for values of n greater than 4. It can be seen in FIG. 1 that an n-bit UNORM value represents one of a sequence of $2^n$ evenly spaced values between and including 0 and 1, with 0 being represented by an n-bit UNORM value with all n bits being zero, and 1 being represented by an n-bit UNORM value with all n bits being one.

As described above, an m-bit UNORM value, y, which corresponds to an n-bit UNORM value, x, is given by equation (1). Since according to the UNORM data format, the m-bit UNORM value, y, must be an integer, equation (1) may require some rounding in order to find an integer value for y. As a simple example, with reference to FIG. 1, where n=2 and m=3, a value of x=1 (i.e. where the bits of x are '01') corresponds to an m-bit UNORM value between 2 and 3 (i.e. between the y values with bits '010' and '011'). The value of y which is chosen (noting that y must be an integer) will be determined by the rounding mode which is used.

As a first example, faithful rounding (FR) may be used which uses a method of bit replication and/or truncation. The magnitude of an error of a faithfully rounded value is less than one. That is, the difference between a true value (y) and the corresponding faithfully rounded value ($y_{FR}$) is in the range: $-1<y-y_{FR}<+1$. As a consequence of the accuracy freedom in the faithfully rounded value, there is often a choice between two faithfully rounded values. Faithful rounding is relatively simple to implement, requiring little or no hardware and provides a result for y relatively quickly (compared to other rounding modes described herein). In particular, in most cases, no logic will be used at all to determine the faithfully rounded value. However, the accuracy of faithful rounding is relatively low compared to other rounding modes described herein.

Figure 2:
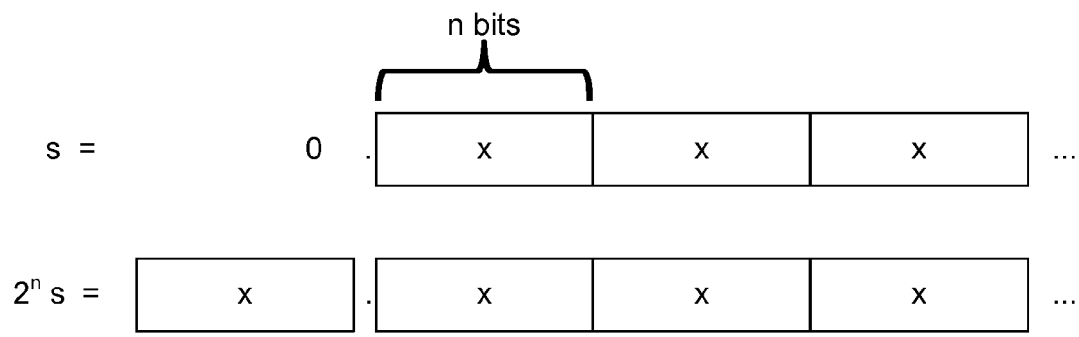
FIG. 2 illustrates a useful mathematical identity.

FIG. 2 illustrates a useful mathematical identity which is exploited in the methods described herein. In particular, for a value, s, which is represented by an infinite repetition of the n bits of x placed after the binary point, it can be appreciated from FIG. 2 that $2^n s - s = x$, which can be rearranged to give:

$$s = \frac{x}{2^n - 1}. \tag{2}$$

Figure 6A:
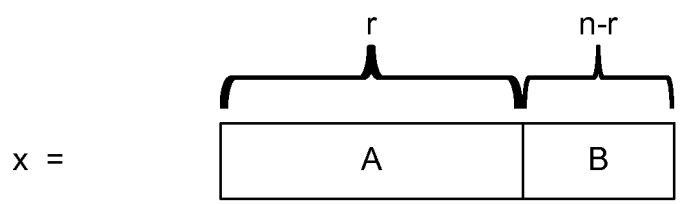
FIG. 6a is a representation of how an n-bit UNORM data value may be decomposed.

According to the faithful rounding mode a value, r, is determined, where r=m mod n, and the bits of the n-bit UNORM value, x, are decomposed into two sections. A first of the sections, "A", comprises the r most significant bits of x. A second of the sections, "B", comprises the n−r least significant bits of x. This is represented in FIG. 6a. In other words, $x = 2^{n-r} A + B$, wherein $$A = \left\lfloor \frac{x}{2^{n-r}} \right\rfloor = \frac{x}{2^{n-r}} - \frac{x \bmod 2^{n-r}}{2^{n-r}}.$$

The value of y given by the faithful rounding, $y_{FR}$, is simply given by appending A to a concatenation of $$\left\lfloor \frac{m}{n} \right\rfloor$$

copies of x. This can be written as:

$$y_{FR} = \left\lfloor \frac{2^m - 1}{2^n - 1} \right\rfloor x + A.$$

Another way to describe this is that the m bits of $y_{FR}$ are equal to the m most significant bits of a concatenation of $$\lceil \frac{m}{n} \rceil$$

copies of x. It is noted that $y_{FR}$ is an integer.

Figure 3:
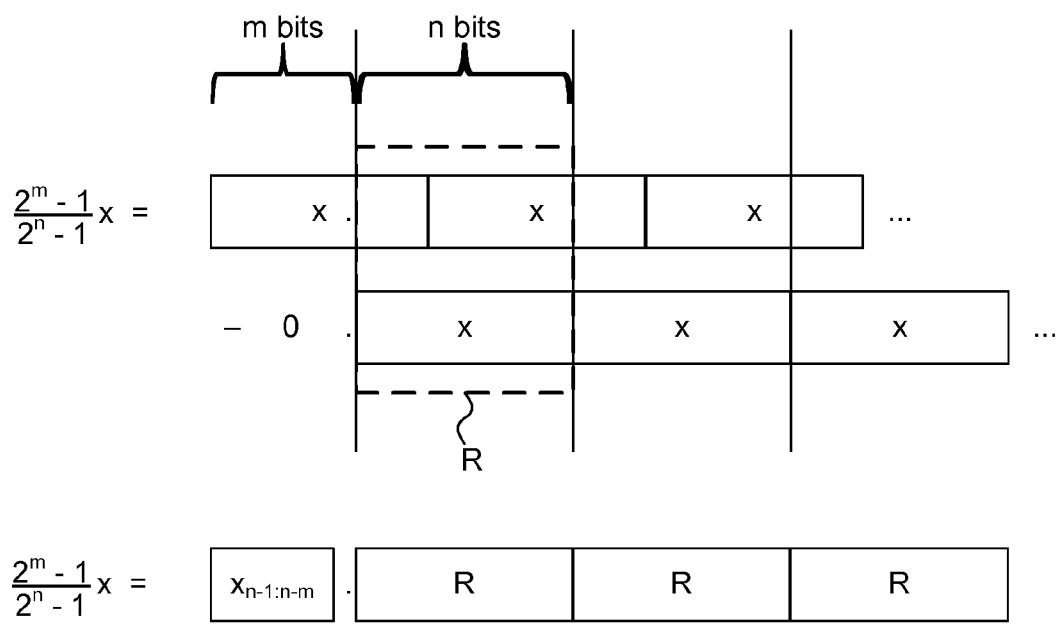
FIG. 3 illustrates how an m-bit UNORM value may be represented.

FIG. 3 illustrates how an m-bit UNORM value may be represented in the case where m<n. Equation (1) can be written as $$y = \frac{2^m x}{2^n - 1} - \frac{x}{2^n - 1}.$$

This can be represented using equation (2) as shown in FIG. 3. It can be seen that for the faithful rounding mode when m<n, $y_{FR}$ is given by the m most significant bits of x, that is the bits denoted $x_{n-1:n-m}$ in FIG. 3.

As described above, the faithful rounding mode provides a quick and cheap (in terms of power and silicon area) solution for providing a rounded value for y.

However, it is shown herein that the value of $y_{FR}$ is either correct (according to a particular rounding mode) or only one away from the correct value (according to the particular rounding mode). This realisation can then be used and built upon to determine whether and how to adjust the value of $y_{FR}$ to give the correct value according to a particular rounding mode. The bits of the n-bit UNORM value can be used to select an output state indicating how the m-bit UNORM value, y, should be determined from $y_{FR}$ according to a particular rounding mode. The m-bit UNORM value, y, is then determined from $y_{FR}$ in accordance with the output state to be equal to one of a plurality of candidate values. The candidate values are $y_{FR}$ and at least one of $y_{FR}-1$ and $y_{FR}+1$. The candidate values (i.e. the possible values of y) depend upon the rounding mode. This is illustrated in the examples given below.

We hereby show that the difference between the true (unrounded) value, y, and the faithfully rounded value, $y_{FR}$, $|y-y_{FR}|<1$:

$$y - y_{FR} = \frac{x(2^m - 1)}{2^n - 1} - \lfloor \frac{2^m - 1}{2^n - 1} \rfloor x - A$$
$$y - y_{FR} = \frac{x(2^r - 1)}{2^n - 1} - A$$
$$y - y_{FR} = \frac{(2^{n-r}A + B)(2^r - 1)}{2^n - 1} - A$$
$$y - y_{FR} = B\left(\frac{2^r - 1}{2^n - 1}\right) - A\left(\frac{2^{n-r} - 1}{2^n - 1}\right)$$

We can see, with reference to FIG. 6a that A is in the range from 0 to $(2^r-1)$ and B is in the range from 0 to $(2^{n-r}-1)$, and that the values of A and B are independent. Therefore, the maximum value that $(y-y_{FR})$ could be is if A=0 and B=$2^{n-r}-1$, i.e.:

$$(y - y_{FR})_{max} = \frac{(2^{n-r} - 1)(2^r - 1)}{2^n - 1} < 1$$

Furthermore, the minimum value that $(y-y_{FR})$ could be is if A=$2^r-1$ and B=0, i.e.:

$$(y - y_{FR})_{min} = -\frac{(2^{n-r} - 1)(2^r - 1)}{2^n - 1} > -1$$

It is therefore proved that $|y-y_{FR}|<1$. Thus $y_{FR}$ is a faithful rounding of y.

Without this proof, the accuracy of the faithfully rounded value $y_{FR}$ is not apparent. For example, without this proof it is not apparent whether $y_{FR}$ always gives the correct value of y (according to a particular rounding mode), or whether $y_{FR}$ always underestimates y, or whether $y_{FR}$ always overestimates y, or whether $|y-y_{FR}|$ could be greater than 1, etc. However, with the proof given above, it is shown that $|y-y_{FR}|<1$.

It has been observed that the faithful rounding mode is not necessarily accurate enough in some situations. Therefore, a more accurate rounding mode may be preferred. One example of such a rounding mode is a rounding mode in which non-integer values are rounded down to the next integer. For example the rounding mode may be a round to zero (RTZ) rounding mode or a round to negative infinity (RTN) rounding mode. Since UNORM values are unsigned, RTZ and RTN rounding modes will act in the same way on the UNORM values. However, it is noted that for SNORM values, which are signed, the RTZ and RTN rounding modes will differ when rounding negative values.

For RTZ, the rounded m-bit value, $y_{RTZ}$, is given by:

$$y_{RTZ} = \lfloor \frac{x(2^m - 1)}{2^n - 1} \rfloor$$

As illustrated in FIG. 3, for the case of m<n:

$$\frac{x(2^m - 1)}{2^n - 1} = x_{n-1:n-m} + \frac{R}{2^n - 1}$$

and for the general case, where m may be greater than or less than n, $$\frac{x(2^m - 1)}{2^n - 1} = y_{FR} + \frac{R}{2^n - 1}$$

where R is the result of the subtraction of the n bits of x from n bits comprising the r most significant bits of the normalized n-bit value appended to the n−r least significant bits of the normalized n-bit value, where r=m mod n. It can be understood that $$y - y_{FR} = \frac{R}{2^n - 1},$$

such that in accordance with the description given above in relation to the faithful rounding mode, it can be shown that $$\left| \frac{R}{2^n - 1} \right| < 1.$$

Since $y_{FR}$ is an integer, $$y_{RTZ} = \left\lfloor \frac{x(2^m - 1)}{2^n - 1} \right\rfloor = y_{FR} + \left\lfloor \frac{R}{2^n - 1} \right\rfloor$$

Therefore, if $R \geq 0$ then $y_{RTZ} = y_{FR}$, whereas if $R < 0$ then $y_{RTZ} = y_{FR} - 1$.

Figure 4:
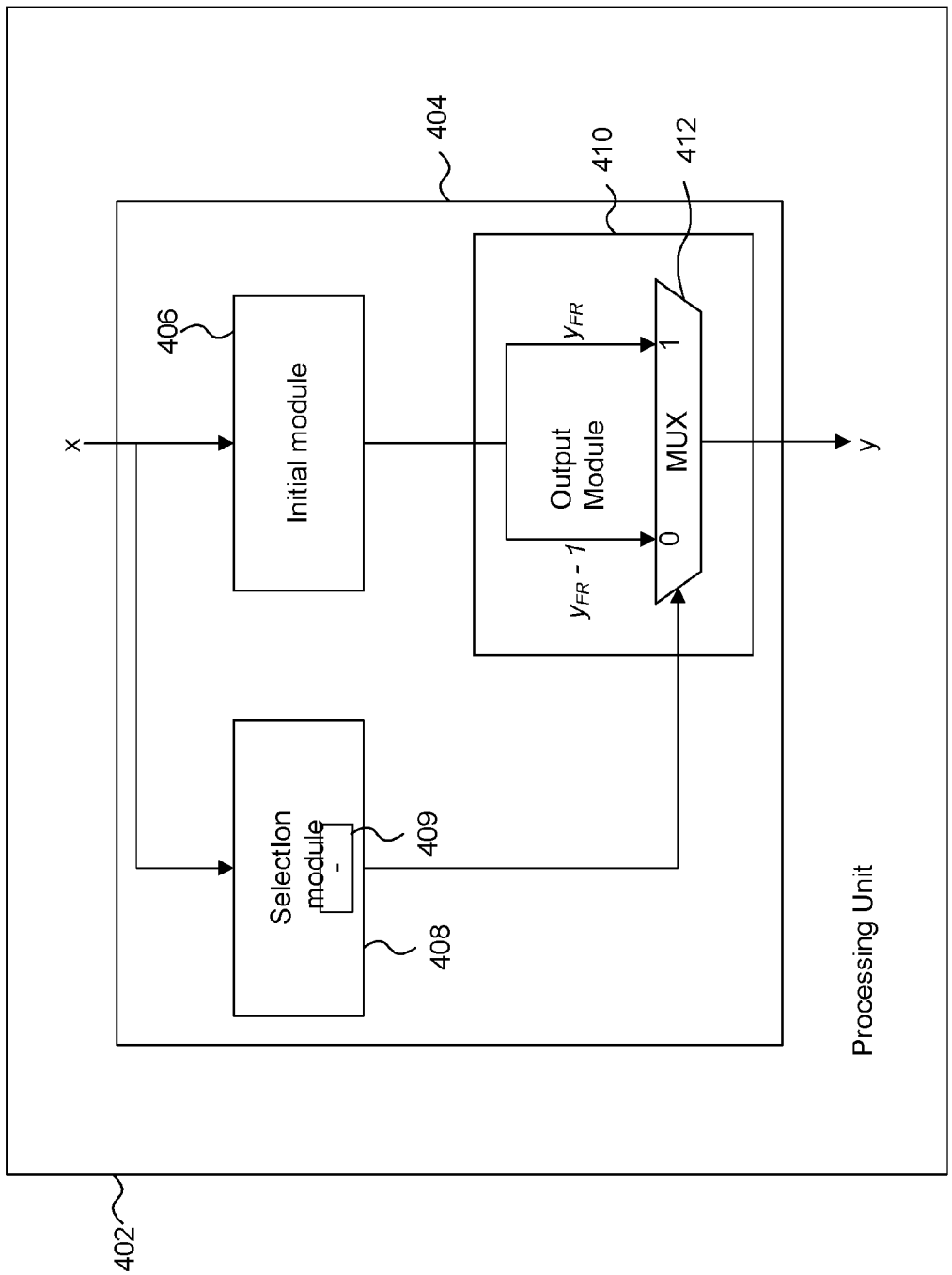
FIG. 4 is a schematic diagram of a processing unit comprising logic.

FIG. 4 is a schematic diagram of a processing unit 402. The processing unit 402 may be implemented in any suitable device, such as a computer, mobile phone, tablet, television, games console, or any other device which may include a processing unit configured to perform a conversion of an n-bit normalized value into an m-bit normalized value. The processing unit 402 comprises logic 404. The logic 404 comprises an initial module 406, a selection module 408 and an output module 410. The selection module 408 comprises a subtractor 409. The output module 410 comprises a multiplexer 412. The logic is configured to receive the n-bit UNORM value, x. In particular, the initial module 406 and the selection module 408 are configured to receive x. An output of the initial module 406 is coupled to an input of the output module 410, and the output module 410 is configured such that two data inputs are provided to the multiplexer 412. An output of the selection module 408 is coupled to a second input of the output module 410. In particular, the output of the selection module 408 is coupled to the control input of the multiplexer 412. An output of the multiplexer 412 is coupled to an output of the logic 404. The output from the multiplexer 412 represents the m-bit UNORM value, y. The logic 404 and the modules therein may be implemented in software, hardware or a combination thereof.

Figure 5:
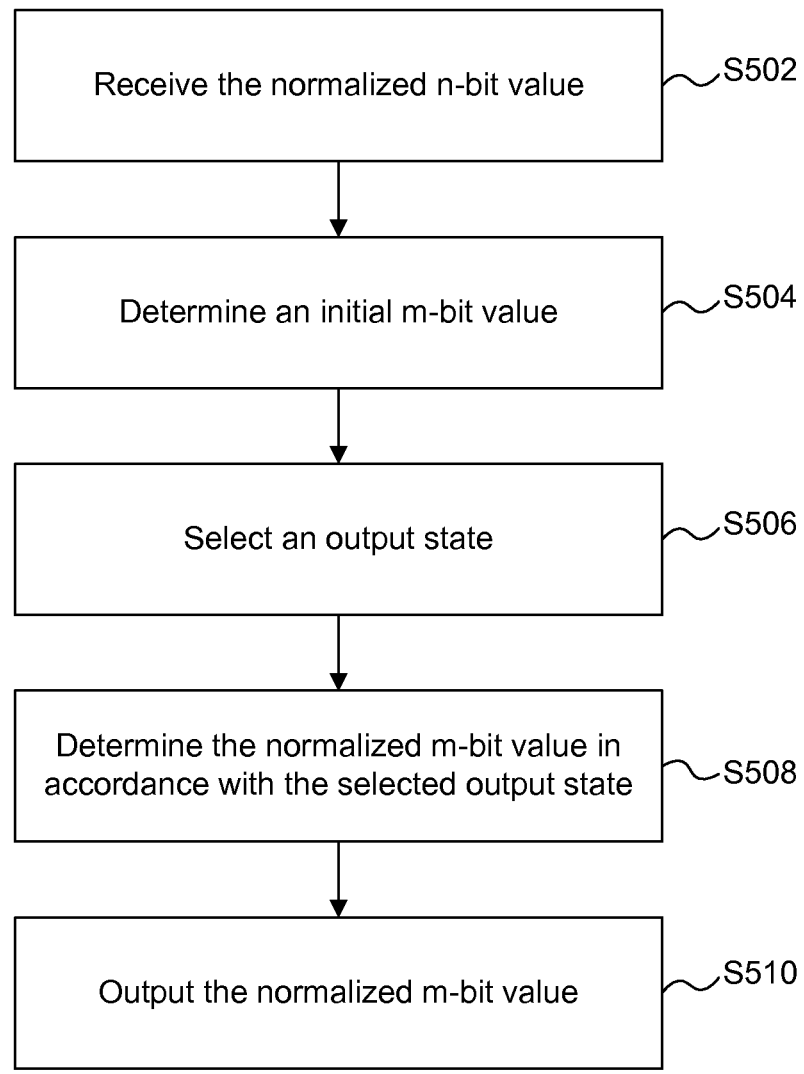
FIG. 5 is a flow chart for a process of converting a normalized n-bit value into a normalized m-bit value.

The operation of the processing unit 402 is described with reference to the flow chart shown in FIG. 5. In step S502 the n-bit UNORM value, x, is received at the logic 404. The value x may be received from any other processing block, logic or memory of the processing unit 402 which, for clarity, is not shown in FIG. 4. For example, x may be received from another process or application which is executing on the processing unit 402.

In step S504 the initial module 406 determines an initial m-bit value. The initial m-bit value is the faithfully rounded value, $y_{FR}$. That is, the bits of the initial m-bit value are determined by the initial module 406 to be equal to the m most significant bits of a concatenation of $$\left\lceil \frac{m}{n} \right\rceil$$

copies of the n-bit UNORM value, x. The faithfully rounded value $y_{FR}$ is outputted from the initial module 406 and provided to the output module 410. As an example, when m<n, the initial module may determine $y_{FR}$ simply by taking the m most significant bits of the n-bit UNORM value, x. The initial module 406 may be implemented in software alone. In other words, it may be the case that no hardware is used to implement the initial module 406.

In step S506 the selection module 408 receives the n-bit value, x, and selects an output state based on the bits of x and based on the rounding mode that is currently being used, which in the example currently being described is RTZ. For example, the selection module 408 may comprise a subtractor 409 configured to determine the value of R. As described above, and as illustrated in FIGS. 6a and 6b, R is the result of the subtraction of the n bits of x (shown as AB in FIG. 6b) from n bits (shown as BA in FIG. 6b) comprising the r most significant bits of x (i.e. A) appended to the n−r least significant bits of x (i.e. B), where r=m mod n. The subtractor 409 of the selection module 408 may be implemented in hardware, thereby allowing the subtraction to be performed relatively quickly.

As described above, when the RTZ rounding mode is being used, if $R \geq 0$ then $y_{RTZ} = y_{FR}$, whereas if $R < 0$ then $y_{RTZ} = y_{FR} - 1$. Therefore, in order to determine whether $y_{RTZ} = y_{FR}$ or $y_{RTZ} = y_{FR} - 1$, the selection module 408 needs to determine the sign of R, i.e. the sign of the subtraction shown in FIG. 6b.

The output state which is outputted from the selection module 408 may for example be a '1' if the sign of R is positive and may be a '0' if the sign of R is negative. The output state is provided to the control input of the multiplexer 412.

In step S508 the output module 410 determines the m-bit UNORM value, y, in accordance with the output state selected in step S506. In particular, the output module 410 receives the faithfully rounded value $y_{FR}$ from the initial module 406 and provides two inputs to the data inputs of the multiplexer 412. In particular, the faithfully rounded value, $y_{FR}$, is provided to the high data input of the multiplexer 412 and $y_{FR} - 1$ is provided to the low data input of the multiplexer 412. The output module 410 may perform a decrement operation in order to determine $y_{FR} - 1$ (from $y_{FR}$) which is then provided to the low data input of the multiplexer 412. The decrement operation may be performed by a subtractor, but the decrement operation could be optimized by using a specialized decrementor component. A specialized decrementor component can be used because one of the values being subtracted is a constant and just a bit e.g. 1. A specialized decrementor component may be smaller in area and faster than a general subtractor of the same size.

In step S510, in accordance with the standard operation of a multiplexer, the multiplexer 412 outputs either $y_{FR}$ or $y_{FR} - 1$ in accordance with the value of the output state received at the control input of the multiplexer 412. The value outputted from the multiplexer 412 is outputted from the logic 404 to be used as the m-bit UNORM value, y. The multiplexer 412 may be implemented in hardware, thereby allowing the output of either $y_{FR}$ or $y_{FR} - 1$ to be performed relatively quickly.

There has therefore been described a method, implemented by the logic 404 in the processing unit 402, which can determine the m-bit UNORM value, y, from the n-bit UNORM value, x, according to the RTZ rounding mode. This is achieved with a more accurate result than the example in which the faithfully rounded value $y_{FR}$ is used as the m-bit UNORM value, y. Furthermore, this is achieved faster and using less silicon area and processing power than the full determination of $$y = \frac{2^m - 1}{2^n - 1} x$$

implemented by performing a multiplication operation, an addition operation and a division operation as described in the background section above.

Figure 6B:
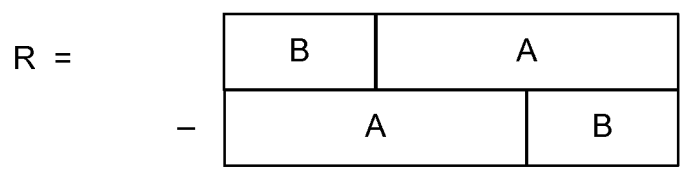
FIG. 6b is a representation of a subtraction.

The subtractor 409 used in the selection module 408 to determine the value of R may be an n-bit subtractor, e.g. as shown in FIG. 6b. However, we can reduce the silicon area and processing power used by the subtractor 409 in the selection module 408 by implementing the subtractor 409 in the selection module 408 as an (n−k)-bit subtractor, where k is the greatest common divisor of n and m. We show below that an (n−k)-bit subtractor is sufficient for determining the sign of R. As described above, it is the sign of R that is determined in order to select between outputting $y_{FR}$ or $y_{FR}-1$ in the RTZ rounding mode.

For example, if r and n are coprime, then k=1. The only way that the sign of a subtraction differs, when ignoring the least significant bit, is when the subtraction used to determine R includes numbers of the form:

TABLE 1

| $X_{n-r-1}$ | ... | $X_i$ | ... | $X_{n-r+1}$ | $X_{n-r} = 0$ |
| ∥ | ∥ | ∥ | ∥ | ∥ | ∥ |
| $X_{n-1}$ | ... | $X_{(i+r) \bmod n}$ | ... | $X_1$ | $X_0 = 1$ |

That is, the only way that the sign of a subtraction differs, when ignoring the least significant bit, is when all of the columns of the subtraction have equal values, except for the last column which has a value of zero on the top and a value of one on the bottom. However, due to the relationship between the two n-bit values which are involved in the subtraction, the situation shown in Table 1 above cannot occur. This can be seen in that the number of high bits in the top row must equal the number of high bits in the bottom row of the subtraction shown in Table 1. Therefore an (n−1)-bit subtractor is sufficient for determining the sign of R when n and r are coprime.

Figure 7A:
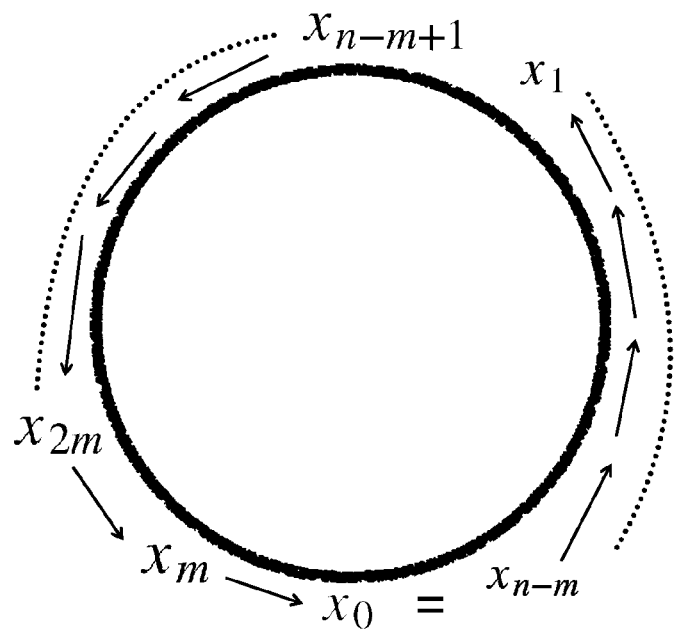
FIG. 7a illustrates that an (n−1)-bit subtractor is sufficient.

FIG. 7a represents this in another way, for the case of m<n, such that m=r. The circle shown in FIG. 7a has the values of the n bits of x. As we move anti-clockwise around the circle we shift by m bits to the right. Therefore, the subtraction of each bit in the circle from the next anti-clockwise bit corresponds to the subtraction of one of the columns in Table 1. If all but one of the neighbouring pairs of bits in the circle are equal then the last pair of bits in the circle must also be equal. Since m and n are coprime the circle shown in FIG. 7a covers all bits of x.

As an example, for the case of r=4 and n=5, R may be given by the subtraction of the bits shown in Table 2:

TABLE 2

| $X_0$ | $X_4$ | $X_3$ | $X_2$ | $X_1$ |
| ∥ | ∥ | ∥ | ∥ | ∥ |
| $X_4$ | $X_3$ | $X_2$ | $X_1$ | $X_0$ |

It can be seen from the first four columns of Table 2 that $X_0=X_4=X_3=X_2=X_1$. Therefore, even without considering the final column of Table 2, it can be determined that $X_1=X_0$. In no other situation does the final column of the table affect the sign of R. Therefore, we do not need to consider the final column of Table 2 when determining the sign of R.

However, an (n−2)-bit subtractor is not sufficient for determining the sign of R when n and r are coprime. For example, the arrangement of bits shown in Table 3 will result in a negative value of R. However, if the last two columns of the table are ignored, the result would be returned as R=0.

TABLE 3

| $X_{n-r-1}$ | ... | $X_i$ | ... | $X_{n-r+2}$ | 0 | 1 |
| ∥ | ∥ | ∥ | ∥ | ∥ | ∥ | ∥ |
| $X_{n-1}$ | ... | $X_{(i+r) \bmod n}$ | ... | $X_2$ | 1 | 0 |

Figure 7B:
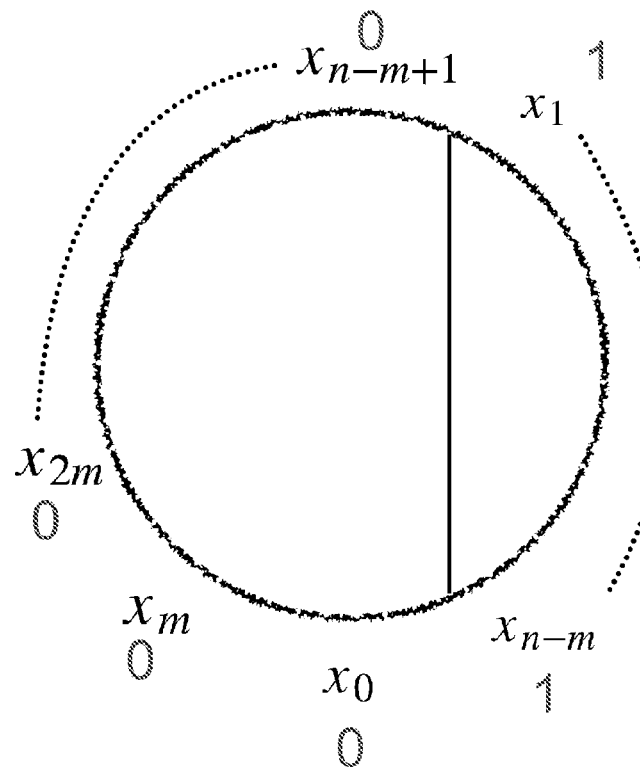
FIG. 7b illustrates that an (n−2)-bit subtractor is not sufficient.

The arrangement of bits shown in Table 3 is possible. This is illustrated by the circle shown in FIG. 7b for the case of m<n, such that m=r.

As an example, for the case of r=4 and n=5, R may be given by the subtraction of the bits shown in Table 4:

TABLE 4

| $X_0$ | $X_4$ | $X_3$ | $X_2 = 0$ | $X_1 = 1$ |
| ∥ | ∥ | ∥ | ∥ | ∥ |
| $X_4$ | $X_3$ | $X_2$ | $X_1 = 1$ | $X_0 = 0$ |

If we ignore the last two columns in Table 4 we would determine that the result of the subtraction is zero, even though it is apparent by considering all of the columns in Table 4 that the result of the subtraction is negative. Therefore, an (n−2)-bit subtractor is not sufficient for determining the sign of R when n and r are coprime. The existence of the example shown in Table 4 shows that an n−1 subtractor is the smallest subtractor that can be used for the case of n and r being coprime when using the RTZ rounding mode.

When r and n are not coprime the argument scales up by k, where k is the greatest common divisor of r and n, i.e. k=gcd (r,n). Generally, an (n−k)-bit subtractor is sufficient (but an (n−k−1)-bit subtractor is not sufficient) for determining the sign of R when using the RTZ rounding mode. It can be shown using similar arguments to those given above that an (n−k)-bit subtractor is the minimal subtractor that can be used in the RTZ rounding mode.

For example, in the case of r=8 and n=10, such that k=2, an 8-bit subtractor is sufficient. That is, ignoring the last two bits of the subtraction will not affect the sign of the result of the subtraction. This is shown, by way of example in Table 5:

TABLE 5

| $X_1 X_0$ | $X_9 X_8$ | $X_7 X_6$ | $X_5 X_4$ | $X_3 X_2$ |
| ∥ | ∥ | ∥ | ∥ | ∥ |
| $X_9 X_8$ | $X_7 X_6$ | $X_5 X_4$ | $X_3 X_2$ | $X_1 X_0$ |

In this example, the even bits are treated separately to the odd bits. For example, it can be seen from Table 5 that $X_0=X_8=X_6=X_4=X_2$. It can also be seen from Table 5 that $X_1=X_9=X_7=X_5=X_3$. Therefore, even without considering the last two columns it can be determined that the result of the subtraction of the last two columns must be zero.

Furthermore, an (n−k−1)-bit subtractor is not sufficient. This can be shown by scaling up the example shown in Table 4 by adding zeros, as shown in Table 6:

TABLE 6

| $0 X_0$ | $0 X_8$ | $0 X_6$ | $0 X_4 = 0$ | $0 X_2 = 1$ |
| ∥ | ∥ | ∥ | ∥ | ∥ |
| $0 X_8$ | $0 X_6$ | $0 X_4$ | $0 X_2 = 1$ | $0 X_0 = 0$ |

Table 6 illustrates an example in which removing k+1 columns (i.e. three columns in the example shown in Table 6) from the subtraction will impact the sign of R. Hence an (n−k−1)-bit subtractor is not sufficient.

One can write:

$$\left\lfloor \frac{(2^m - 1)x}{(2^n - 1)} \right\rfloor = (\hat{R} < 0) ? x_{n-1:n-m} - 1 : x_{n-1:n-m}$$

where, $\hat{R} = ((x \text{ rol } r) >> k) - (x >> k)$ where rol is a function indicating a rotation of the bits of x, such that (x rol r) represents the bits of x rotated by r positions, and where >> indicates a shift of the bits to the right, (e.g. x>>k represents the bits of x shifted to the right by k binary places.

Figure 9A:
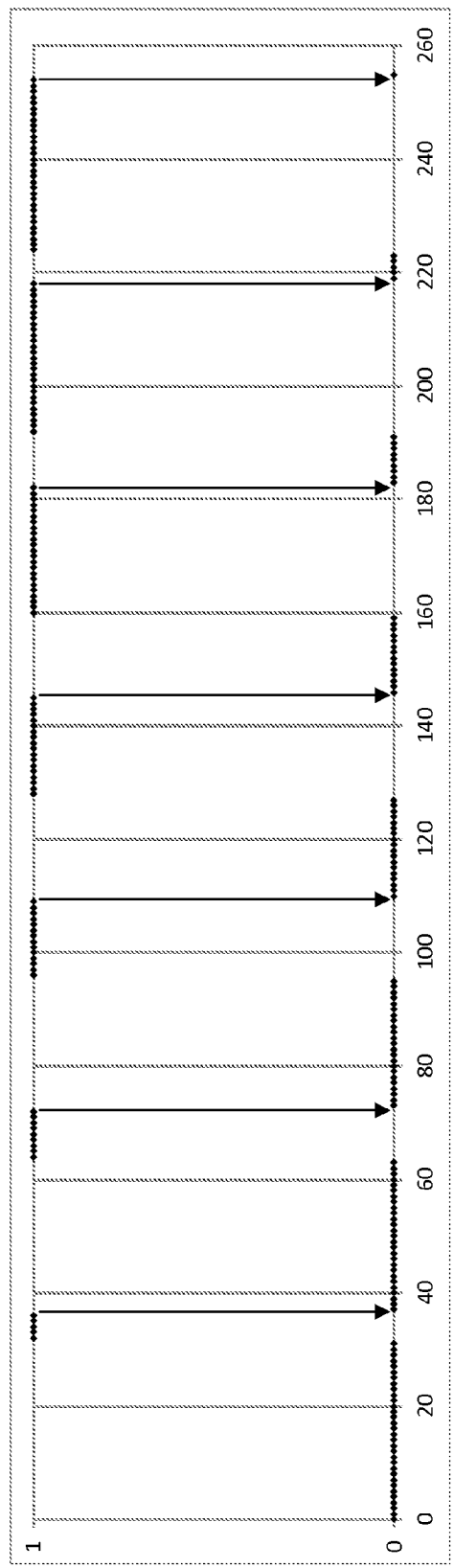
FIG. 9a is a graph of a function, f, which is a function of x for n=8 and r=3.

In some cases the sign of R can be determined in the selection module 208 without needing to use the subtractor 209. FIG. 9a shows the value of a function, f, which is defined such that f=0 if R≥0 and such that f=1 if R<0. In the example shown in FIG. 9a, n=8 and m=3, such that R=(x rol 3)−x, where (x rol 3) has the bits of x rotated by three positions. This is equivalent to the representation of R shown in FIGS. 6a and 6b where r=3. Since n=8, x is in the range from 0 to 255.

In general it can be shown that the function, f, switches from 0 to 1 when x is increased from $j2^{n-r}-1$ to $j2^{n-r}$ for integer j. However, the transitions from 1 to 0 don't occur in such a simple pattern for general n and r. The transitions from 1 to 0 are shown by the arrows in FIG. 9a. There are $2^r-1$ transitions from 1 to 0, which in FIG. 9a occur between the x values: 36 and 37, 72 and 73, 109 and 110, 145 and 146, 182 and 183, 218 and 219, 254 and 255.

Figure 9B:
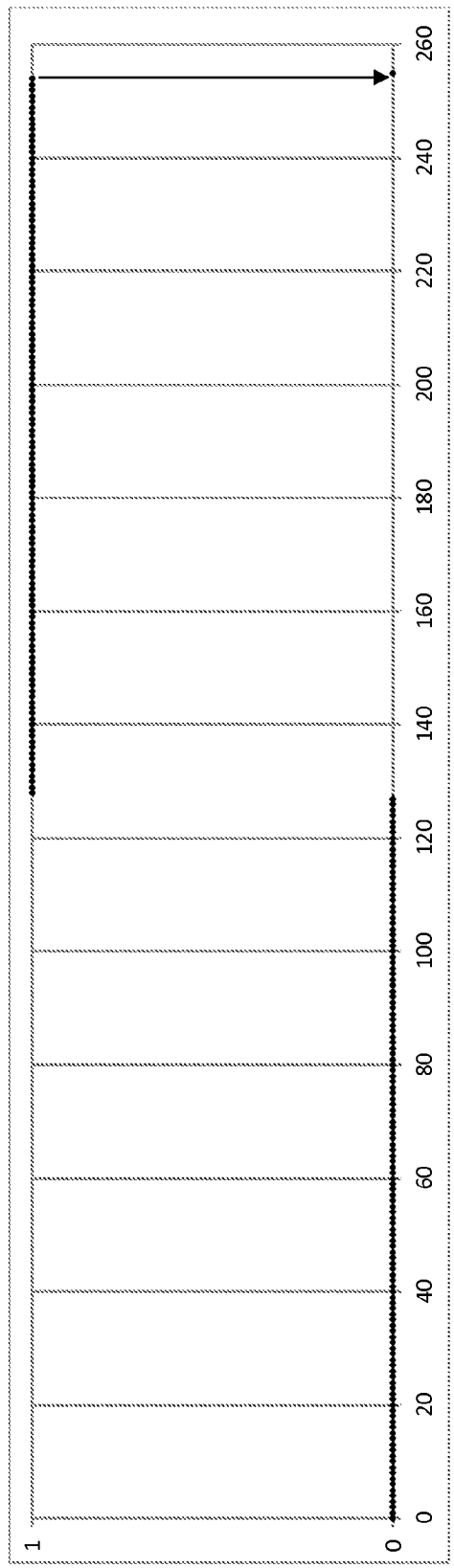
FIG. 9b is a graph of a function, f, which is a function of x for n=8 and r=1.

For some special cases, the sign of R can be determined more simply (e.g. using less silicon area, processing power and/or time) than it is determined using the subtractor 409 as described above. For example, if r=1, such that R=(x rol 1)−x, then for n=8, the function, f, is shown in FIG. 9b. It can be seen in FIG. 9b that for $x<2_{n-1}$, f=0 (indicating that R≥0) and for $2^{n-1} \leq x < 2^n-1$, f=1 (indicating that R<0). It can be appreciated that when R=(x rol 1)−x, and n=8, R is given by the subtraction of two eight-bit values, such that:

$$R=\{x_6,x_5,x_4,x_3,x_2,x_1,x_0,x_7\}-\{x_7,x_6,x_5,x_4,x_3,x_2,x_1,x_0\}.$$

Therefore, if $x_7=1$ then R will be negative unless all of the bits of x are 1. When all of the bits of x are 1 (i.e. when $x=2^n-1$) then R=0. Furthermore, if $x_7=0$ then R≥0. In this case, the function f can be represented by the simple logic equation:

$$x_{n-1}(\overline{x_0}+\overline{x_1}+\overline{x_2}+\ldots+\overline{x_{n-3}}+\overline{x_{n-2}})$$

wherein the bar above a bit value represents a logic NOT operation, a plus sign indicates a logical OR function and the multiplication represents a logical AND operation. Therefore if $x_{n-1}$ is high then R≥0 unless all of the other bits of x are also high. Similarly, if $x_{n-1}$ is low then R<0.

Therefore, for the case of r=1 for the RTZ rounding mode, the sign of R can be simply determined in the selection module 408 using the logic equation given above without the need to use the subtractor 409. The above argument can be extended to all cases of n and m values where r=1.

Figure 9C:
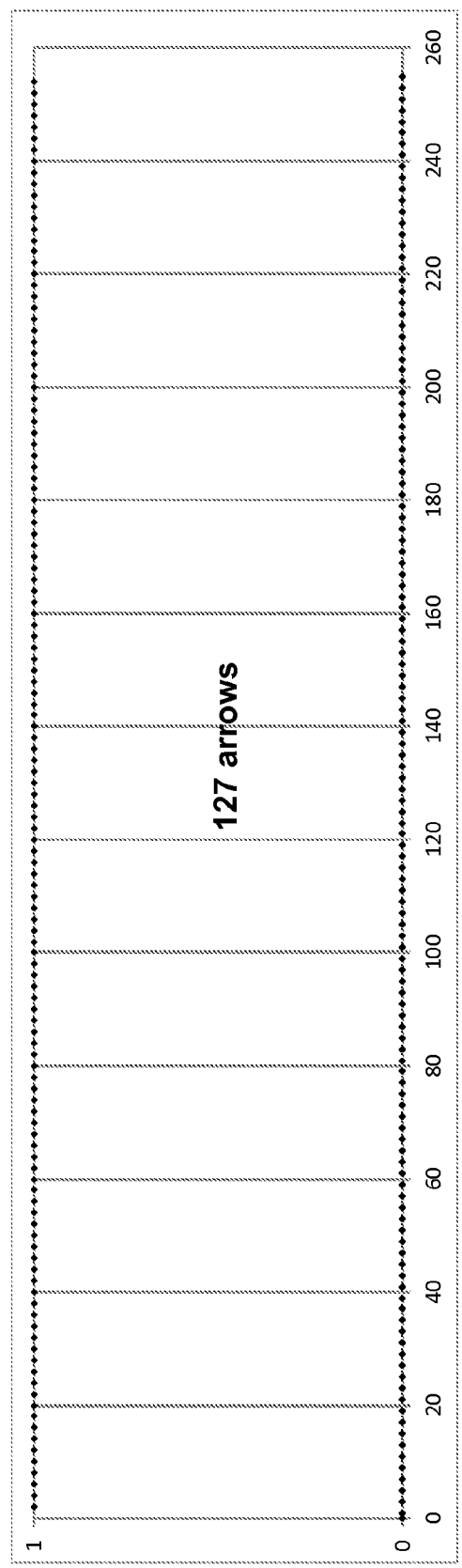
FIG. 9c is a graph of a function, f, which is a function of x for n=8 and r=7.

In another special case, if r=n−1, such that for n=8, R=(x rol 7)−x, then, the function, f, is shown in FIG. 9c. It can be seen in FIG. 9c that for odd values of x (and for x=0), f=0 (indicating that R≥0) and for even values of x, f=1 (indicating that R<0). It can be appreciated that when R=(x rol 7)−x, and n=8, R is given by the subtraction of two eight-bit values, such that:

$$R=\{x_0,x_7,x_6,x_5,x_4,x_3,x_2,x_1\}-\{x_7,x_6,x_5,x_4,x_3,x_2,x_1,x_0\}.$$

Therefore, if $x_0=0$ then R will be negative unless all of the bits of x are 0. Furthermore, if $x_0=1$ then R≥0. In this case, the function f can be represented by the simple logic equation:

$$\overline{x_0}(x_1+x_2+x_3+\ldots+x_{n-2}+x_{n-1})$$

wherein the bar above a bit value represents a logic NOT operation, a plus sign indicates a logical OR function and the multiplication represents a logical AND operation. Therefore if $x_0$ is high (i.e. if x is odd) then R<0. Similarly, if $x_0$ is low (i.e. if x is even) then R≥0 unless all of the other bits of x are also low.

Therefore, for the case of r=n−1 for the RTZ rounding mode, the sign of R can be simply determined in the selection module 408 using the logic equation given above without the need to use the subtractor 409. The above argument can be extended to all cases of n and m values where r=n−1.

For other cases (i.e. when r≠1 and r≠n−1) in the RTZ rounding mode then the subtractor 409 can be used as described above to determine the sign of R.

We have described above the case in which the rounding mode is a rounding mode in which values are rounded down to the next integer (e.g. an RTZ or RTN rounding mode).

The case in which the rounding mode is a rounding mode in which values are rounded up to the next integer (e.g. an RTP rounding mode) is similar to that described above. However, for this rounding mode, the rounded m-bit value, $y_{RTP}$, is given by:

$$y_{RTP} = \left\lceil \frac{x(2^m-1)}{2^n-1} \right\rceil$$

As described above, $$\frac{x(2^m-1)}{2^n-1} = y_{FR} + \frac{R}{2^n-1}$$

where, $$\left| \frac{R}{2^n-1} \right| < 1.$$

Since $y_{FR}$ is an integer, $$y_{RTP} = \left\lceil \frac{x(2^m-1)}{2^n-1} \right\rceil = y_{FR} + \left\lceil \frac{R}{2^n-1} \right\rceil$$

Therefore, if R>0 then $y_{RTP}=y_{FR}+1$, whereas if R≤0 then $y_{RTP}=y_{FR}$. In this case, the output module 410 provides the faithfully rounded value $y_{FR}$ to the low data input of the multiplexer 412 and the value of $y_{FR}+1$ is provided to high data input of the multiplexer 412. The output module 410 may perform an increment operation on $y_{FR}$ in order to determine $y_{FR}+1$. The increment operation may be performed by a general adder, but the increment operation could be optimized by using a specialized incrementor component. A specialized incrementor component can be used because one of the values being added is a constant and just a bit e.g. 1. A specialized incrementor component may be smaller in area and faster than a general adder of the same size. In some examples, whether R>0 or R≤0 may be determined by decrementing R and then determining the sign of the result in a manner equivalent to that described above for determining the sign of R. The reason for decrementing R before determining the sign is so that the case of R=0 can be grouped with the negative values of R rather than the positive values of R. In other examples, the sign of (−R) may be determined. This may be simpler to implement in hardware because it avoids a need to decrement R, and any delay associated therewith. It is noted that a subtractor for determining the sign of (−R) may be implemented in a corresponding manner to the subtractors described above which determine the sign of R. For example, the sign of (−R) may be calculated as described above, e.g.

using an (n−k)-bit subtractor 409 in the selection module 408. The sign of (−R) can be determined using the subtractor 409 simply by swapping the order of the inputs of the subtractor 409 from that described above. Therefore, no extra delay or processing is required by the subtractor 409 to determine the sign of (−R) compared to that required to determine the sign of R as described above. As described above, the subtractor 409 determines the sign of R by determining the sign of the subtraction shown in FIG. 6b, i.e. the subtraction of the n bits of x (shown as AB in FIG. 6b) from n bits (shown as BA in FIG. 6b). The subtractor 409 may determine the sign of (−R) by determining the sign of a subtraction of the n bits (shown as BA) from the n bits of x (shown as AB). As described above, if R is negative (or equal to zero) then the output state provided from the selection module 408 to the control input of the multiplexer 412 has a value of 0 such that the multiplexer outputs $y_{FR}$, whereas if R is positive then the output state provided from the selection module 408 to the control input of the multiplexer has a value of 1 such that the multiplexer outputs $y_{FR}+1$.

Another rounding mode which may be used is one in which values are rounded to the nearest integer (e.g. an RTE rounding mode). This is similar to the examples described above, but there are some differences as described below.

As described above, RTU is a rounding mode in which values are rounded to the nearest integer, with ties to the upper integer, whereas RTE is a rounding mode in which values are rounded to the nearest integer, with ties to the even integer. It is also mentioned above that it can be shown that there is no n-bit UNORM value which represents a value exactly half-way between the values represented by two consecutive m-bit UNORM values. Therefore, for UNORM values, the RTU and RTE rounding modes will give the same outcomes. Therefore, in order to round the value of y to the nearest integer, the following equation for the RTU rounding mode can be used for the RTE rounding mode also:

$$y_{RTU} = y_{RTE} = \left\lfloor \frac{x(2^m-1)}{2^n-1} + \frac{1}{2} \right\rfloor$$

In accordance with the description given above in relation to the RTZ rounding mode, we can write $y_{RTE}$ as:

$$y_{RTE} = y_{FR} = \left\lfloor \frac{R}{2^n-1} + \frac{1}{2} \right\rfloor$$

and by the same reasoning as given above, $$\left| \frac{R}{2^n-1} \right| < 1,$$

such that:

$$-\frac{1}{2} < \frac{R}{2^n-1} + \frac{1}{2} < \frac{3}{2}$$

Furthermore, we note that $R \neq -2^{n-1}$. For R to equal $-2^{n-1}$, the bits of the subtraction used to determine R would need to be of the form:

| 0 | Z[n−2:0] |
| 1 | Z[n−2:0] |

However, this situation cannot occur because the same bits (although in different arrangements) are used to form the top and bottom rows of the subtraction in order to determine R. Therefore, there must be an equal number of high bits on both rows.

For the RTE rounding mode, for the case of $$\left\lfloor \frac{R}{2^n-1} + \frac{1}{2} \right\rfloor = -1,$$

it can be shown that $R < -2^{n-1}+\frac{1}{2}$. However, since $R \neq -2^{n-1}$, it is found that, in this case, $R < -2^{n-1}$. This same inequality is found by setting $$\left\lfloor \frac{R}{2^n} + \frac{1}{2} \right\rfloor = -1.$$

Furthermore, it can be shown that $$\left\lfloor \frac{R}{2^n-1} + \frac{1}{2} \right\rfloor$$

agrees with $$\left\lfloor \frac{R}{2^n} + \frac{1}{2} \right\rfloor$$

for all possible values of R for the cases of $$\left\lfloor \frac{R}{2^n-1} + \frac{1}{2} \right\rfloor = -1,$$

$$\left\lfloor \frac{R}{2^n-1} + \frac{1}{2} \right\rfloor = 0$$

and $$\left\lfloor \frac{R}{2^n-1} + \frac{1}{2} \right\rfloor = +1.$$

Therefore, for a rounding mode in which the values of y are rounded to the nearest integer, $$y_{RTE} = y_{FR} + \left\lfloor \frac{R}{2^n} + \frac{1}{2} \right\rfloor$$

for all possible values of R.

If $-1 < \frac{R}{2^n} < -\frac{1}{2}$, then $y_{RTE} = y_{FR} - 1$.

If $-\frac{1}{2} < \frac{R}{2^n} < +\frac{1}{2}$, then $y_{RTE} = y_{FR}$.

If $+\frac{1}{2} < \frac{R}{2^n} < 1$, then $y_{RTE} = y_{FR} + 1$.

Therefore, for the RTE rounding mode, there are three candidate values for the m-bit UNORM value, $y_{RTE}$, which may be output from the multiplexer 412 depending on the value of R. Therefore, in this case, the multiplexer 412 comprises three data inputs for receiving the three candidate values: $y_{FR}-1$, $y_{FR}$ and $y_{FR}+1$. The output state provided from the selection module 408 to the control input of the multiplexer 412 indicates which of the three candidate values is to be outputted from the multiplexer 412. The output state is determined by performing a subtraction to identify which of the three ranges identified above R falls into. This subtraction is performed by the subtractor 409 in the selection module 408. Compared to the subtractor described above in relation to the RTZ rounding mode, a greater number of the bits need to be considered in the subtraction for the RTE rounding mode because the subtractor 409 needs to determine which of the three ranges R falls into, rather than determining the sign of R as in the RTZ example described above.

Unlike in the RTZ example described above, an (n−k)-bit subtractor is not sufficient. For example, R may be given by the subtraction shown in Table 7:

TABLE 7

| 1 | $X_{n-r-2}$ | ... | $X_{k-r-1}=0$ | ... |
|---|---|---|---|---|
|   | ‖ | ‖ | ‖ | ‖ |
| 0 | $X_{n-2}$ | ... | $X_{k-1}=1$ | ... |

In the case shown in Table 7, the actual value of $$\left\lfloor \frac{R}{2^n} + \frac{1}{2} \right\rfloor$$

is 0. However, calculating the result whilst ignoring the last k columns in Table 7 would give the incorrect result of 1. Table 8 shows an example of this in which n=5, m=3 and k=1 (such that n and r are coprime).

TABLE 8

| $X_1=1$ | $X_0$ | $X_4$ | $X_3$ | $X_2=0$ |
|---|---|---|---|---|
|   | ‖ | ‖ | ‖ |   |
| $X_4=0$ | $X_3$ | $X_2$ | $X_1$ | $X_0=1$ |

In this case we need to consider the last column of the subtraction in order to correctly determine which of the three ranges R falls into.

However, in the case when n and r are not coprime, k is greater than 1. It is shown below that, although an (n−k)-bit subtractor is not sufficient, an (n−k+1)-bit subtractor is sufficient for determining which of the three ranges R falls into.

It is for the same reasons as given above in relation to the case where n and r are coprime, that for the case where n and r are not coprime an (n−k)-bit subtractor is not sufficient. This is shown as an example in Table 9 in which the example of m=3 and n=5 has been scaled up to the case of m=9 and n=15, where k=3, with the addition of zeros:

TABLE 9

| $X_1=1\ 0\ 0$ | $X_0\ 0\ 0$ | $X_4\ 0\ 0$ | $X_3\ 0\ 0$ | $X_2=0\ 0\ 0$ |
|---|---|---|---|---|
|   | ‖ | ‖ | ‖ |   |
| $X_4=0\ 0\ 0$ | $X_3\ 0\ 0$ | $X_2\ 0\ 0$ | $X_1\ 0\ 0$ | $X_0=1\ 0\ 0$ |

It can be seen that ignoring the last k columns (i.e. the last three columns in Table 9) may give an incorrect result for which of the three ranges R falls into. However, due to the relationship between the values in the top and bottom rows of the subtraction, the last (k−1) columns (i.e. the last 2 columns in Table 9) can be ignored and there is not a possible situation in which ignoring these columns will result in the subtractor incorrectly determining which of the three ranges R falls into. Hence, in general for the RTE rounding mode, an (n−k+1)-bit subtractor is sufficient for determining which of the three ranges R falls into.

Therefore for the RTE rounding mode an (n−k+1)-bit subtractor may be implemented in the selection module 408 in order to provide an output state which is then provided to the control input of the multiplexer 412 and used to determine which of the three values: $y_{FR}-1$, $y_{FR}$ and $y_{FR}+1$, is outputted from the logic 404.

For the RTE rounding mode, the selection module 408 is further configured to determine whether m≡±1 mod n. If this is the case then the output state provided from the selection module 408 to the control input of the multiplexer 412 is such that the faithfully rounded value $y_{FR}$ is outputted from the output module 410. In this case the selection module 408 does not need to perform a subtraction. It is shown below that if m≡±1 mod n, then $$\left\lfloor \frac{R}{2^n} + \frac{1}{2} \right\rfloor = 0,$$

which is why for this case the logic 404 outputs the faithfully rounded value, i.e. $y_{RTE}=y_{FR}$.

For example, the case where r=1 is considered. As described above, $R=B(2^r-1)-A(2^{n-r}-1)$. Therefore, for r=1, this becomes $R=B-A(2^{n-1}-1)$.

As can be seen in FIG. 6a, A is in the range from 0 to $2^r-1$, which for r=1 means that A is in the range from 0 to 1. Similarly, as can be seen in FIG. 6a, B is in the range from 0 to $2^{n-r}-1$, which for r=1 means that B is in the range from 0 to $2^{n-1}-1$. Therefore the maximum and minimum values of R are such that:

$$-(2^{n-1}-1) \leq R \leq (2^{n-1}-1).$$

Therefore:

$$0 \leq \frac{R}{2^n} + \frac{1}{2} \leq \frac{2^n-1}{2^n} < 1$$

which leads to the conclusion that, as described above:

$$\left\lfloor \frac{R}{2^n} + \frac{1}{2} \right\rfloor = 0$$

For example, the case where r=n−1 is considered. For this case:

$$R=B(2^{n-1}-1)-A.$$

Therefore the maximum and minimum values of R are such that:

$$-(2^{n-1}-1) \leq R \leq (2^{n-1}-1)$$

which, as described above, leads to the conclusion that:

$$\left\lfloor \frac{R}{2^n} + \frac{1}{2} \right\rfloor = 0$$

Figure 8:
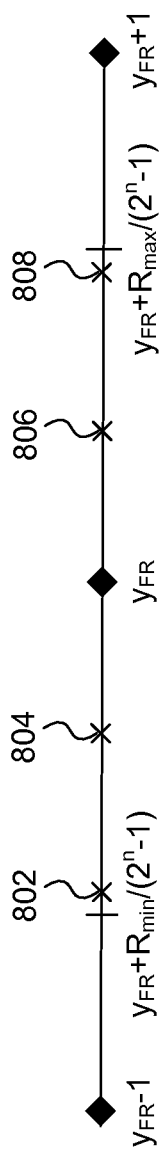
FIG. 8 is an illustration of how m-bit UNORM values may be rounded.

FIG. 8 shows a range of three of the m-bit values from $y_{FR}-1$ to $y_{FR}+1$. For an n-bit value to be converted to an m-bit value such that the faithfully rounded value is equal to $y_{FR}$ then the n-bit value must lie in the range from $$\left(y_{FR} + \frac{R_{min}}{2^n - 1}\right) \text{ to } \left(y_{FR} + \frac{R_{max}}{2^n - 1}\right).$$

As shown in FIG. 8 the range of $$\left(y_{FR} + \frac{R_{min}}{2^n - 1}\right) \text{ to } \left(y_{FR} + \frac{R_{max}}{2^n - 1}\right)$$

lies entirely within the range of from $y_{FR}-1$ to $y_{FR}+1$. This is because, as described above, $$\left|\frac{R}{2^n - 1}\right| < 1.$$

Four different n-bit values are shown in FIG. 8, denoted 802, 804, 806 and 808. All four of these values can be faithfully rounded to $y_{FR}$. If the RTZ rounding mode (or RTN rounding mode) is used then the m-bit value corresponding to the n-bit values 802 and 804 will be $y_{FR}-1$, whereas the m-bit value corresponding to the n-bit values 806 and 808 will be $y_{FR}$. If the RTP rounding mode is used then the m-bit value corresponding to the n-bit values 802 and 804 will be $y_{FR}$, whereas the m-bit value corresponding to the n-bit values 806 and 808 will be $y_{FR}+1$. If the RTE rounding mode is used then the m-bit value corresponding to the n-bit value 802 will be $y_{FR}-1$, the m-bit value corresponding to the n-bit values 804 and 806 will be $y_{FR}$, whereas the m-bit value corresponding to the n-bit value 808 will be $y_{FR}+1$. It can therefore be seen from FIG. 8 that the rounding mode which is used will affect the result of the conversion of an n-bit normalized value into an m-bit normalized value.

In the examples described above, the output from the selection module 408 is used as the control input of the multiplexer 412 to select between the candidate m-bit values. This means that each of the candidate m-bit values are calculated and provided to the data inputs of the multiplexer 412. In alternative examples, rather than use a multiplexer as shown in FIG. 4, the output module 410 may receive the faithfully rounded value $y_{FR}$ and, based on the output state received from the selection module 408, may do one of: output the faithfully rounded value $y_{FR}$, increment the faithfully rounded value $y_{FR}$ by one before outputting the value of $y_{FR}+1$, or decrement the faithfully rounded value $y_{FR}$ by one before outputting the value of $y_{FR}-1$. In this way the values of $y_{FR}+1$ and/or $y_{FR}-1$ are only calculated by the output module 410 if they are going to be outputted from the output module 410. In these examples, as for the examples described above which implement the multiplexer 412, the normalized m-bit value is determined in the output module 410, in accordance with the output state from the selection module 408, to be equal to one of a plurality of candidate m-bit values, wherein the plurality of candidate m-bit values consists of $y_{FR}$, $y_{FR}-1$ and $y_{FR}+1$.

There are described above examples in which an n-bit UNORM value is converted into an m-bit UNORM value. In other examples, an n-bit SNORM value may be converted into an m-bit SNORM value using corresponding principles. The exact form of the selection module 408 (e.g. of the subtractor 409 implemented therein) may be different for use in converting SNORM values compared to those described above for use in converting UNORM values due to the differences in the formats, e.g. the presence of the sign bit in the SNORM values. However, the conversion of an n-bit SNORM value to an m-bit SNORM value can use the same principle that an initial m-bit value (e.g. $y_{FR}$) is determined, where the bits of the initial m-bit value are determined to be equal to the m most significant bits of a concatenation of one or more copies of a group of one or more bits derived from the normalized n-bit value, and then an output state is selected based on bits of the normalized n-bit value and in accordance with the predetermined rounding mode, whereby the output state indicates how the normalized m-bit value is to be determined from the initial m-bit value, and then in accordance with the selected output state, the normalized m-bit value is determined to be equal to one of a plurality of candidate m-bit values, wherein the plurality of candidate m-bit values consists of the initial m-bit value and at least one of: (i) the initial m-bit value incremented by one, and (ii) the initial m-bit value decremented by one. This is similar to the method used in the case of converting UNORM values, but there is an allowance for the sign bit which is present in SNORM values. In the UNORM conversion described above, the initial m-bit value is determined to be equal to the m most significant bits of a concatenation of $$\lceil \frac{m}{n} \rceil$$

copies of the normalized n-bit value. Due to the sign bit of SNORM values, a decrement operation of the sign bit on the remaining n-1 bits of the n-bit SNORM value is performed to form a group of n-1 bits which can then be copied and concatenated for use in determining the initial m-bit value.

Furthermore, these same principles could be applied to the conversion of any n-bit normalized value into a correspondingly normalized m-bit value. For example, a further normalizing format could be used which is similar to the SNORM format. As described above, a number may be represented using an n-bit SNORM, whereby the maximum signed n-bit value represents +1 whilst the minimum signed n-bit value represents −1. In addition the second-minimum signed n-bit value also represents −1 such that there are two representations for −1. This results in a set of integer representations for evenly spaced values in the range −1 to 0, and also a complementary set of representations for numbers in the range 0 to 1. In contrast, in the further normalizing format, there is just one representation for −1, such that the second-minimum signed n-bit value does not represent −1. In this case, a value of $-2^{n-1}$ represents the number −1 and a value of $2^{n-1}-1$ represents the number +1, and the other possible values of the n-bit value represent evenly spaced numbers between −1 and +1. This means that there is not a value which represents the number zero.

Generally, any of the functions, methods, techniques or components described above can be implemented in modules using software, firmware, hardware (e.g., fixed logic circuitry), or any combination of these implementations. The terms "module," "functionality," "component" and "logic" are used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. That is, the computer-readable medium may be a non-transitory computer-readable medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of processing data in a processor by converting in computing logic a normalized n-bit data value which represents one of $2^n$ evenly spaced values within a particular range into a normalized m-bit value which represents one of $2^m$ evenly spaced values within the particular range in accordance with a predetermined rounding mode, the method comprising:
   receiving the normalized n-bit value at an initial module of the computing logic;
   determining, by the initial module, an initial m-bit value, wherein the bits of said initial m-bit value are determined to be equal to the m most significant bits of a concatenation of one or more copies of a group of one or more bits derived from the received normalized n-bit value;
   based on bits of the normalized n-bit value and in accordance with the predetermined rounding mode, selecting at a selection module of the computing logic an output state indicating a predefined manner of determining the normalized m-bit value from the initial m-bit value;
   in accordance with the selected output state, determining, at an output module of the computing logic, from the normalized n-bit value the normalized m-bit value to be equal to one of a plurality of candidate m-bit values, the plurality of candidate m-bit values consisting of the initial m-bit value and at least one of: (i) the initial m-bit value incremented by one, and (ii) the initial m-bit value decremented by one; and
   outputting, from the output module, the determined normalized m-bit value converted from the normalized n-bit data value, whereby the data represented by the normalized n-bit data value can be processed in a processor using the normalized m-bit value.

2. The method of claim 1 wherein the bits of said initial m-bit value are determined to be equal to the m most significant bits of a concatenation of $$\lceil \frac{m}{n} \rceil$$

copies of the received normalized n-bit value.

3. The method of claim 1 wherein said selecting an output state comprises determining a value of a subtraction of a first arrangement of the bits of the normalized n-bit value from a second arrangement of the bits of the normalized n-bit value.

4. The method of claim 3 wherein the first arrangement is equal to the n bits of the normalized n-bit value having r most significant bits and n−r least significant bits, and wherein the second arrangement is equal to n bits comprising the r most significant bits of the normalized n-bit value appended to the n−r least significant bits of the normalized n-bit value, where r=m mod n.

5. The method of claim 4 wherein said determining a value of the subtraction comprises determining the sign of the result of the subtraction.

6. The method of claim 5 wherein the sign of the result of the subtraction is determined using an (n−k)-bit subtractor, where k is the greatest common divisor of n and m.

7. The method of claim 4 wherein the predetermined rounding mode is a rounding mode in which non-integer values are rounded to the nearest integer, and wherein said determining a value of the subtraction comprises determining whether the result of the subtraction divided by $2^n$ lies within a first range of −1 to −½, within a second range of −½ to +½, or within a third range of +½ to 1.

8. The method of claim 7 wherein in accordance with the predetermined rounding mode, the plurality of candidate m-bit values consists of the initial m-bit value, the initial m-bit value incremented by one and the initial m-bit value decremented by one.

9. The method of claim 7 wherein the value of the subtraction is determined using an (n−k+1)-bit subtractor, where k is the greatest common divisor of n and m.

10. The method of claim 1 wherein the predetermined rounding mode is a rounding mode in which non-integer values are rounded down to the next integer.

11. The method of claim 10 wherein in accordance with the predetermined rounding mode, the plurality of candidate m-bit values consists of the initial m-bit value and the initial m-bit value decremented by one.

12. The method of claim 10 wherein:
if r=1 said selecting an output state comprises determining the value of a function $f_1$ represented by a logic equation given by $x_{n-1}(\overline{x}_0+\overline{x}_1+\overline{x}_2+\ldots+\overline{x_{n-3}}+\overline{x_{n-2}})$ and selecting an output state in dependence on the value of $f_1$; and
if r=n−1 said selecting an output state comprises determining the value of a function $f_2$ represented by a logic equation given by $\overline{x}_0(x_1+x_2+x_3+\ldots+x_{n-2}+x_{n-1})$ and selecting an output state in dependence on the value of $f_2$,
where $x_0$ to $x_{n-1}$ are the n bits of the normalized n-bit value, and where r=m mod n.

13. The method of claim 1 wherein the predetermined rounding mode is a rounding mode in which non-integer values are rounded up to the next integer.

14. The method of claim 13 wherein in accordance with the predetermined rounding mode, the plurality of candidate m-bit values consists of the initial m-bit value and the initial m-bit value incremented by one.

15. The method of claim 13 wherein if m≡±1 mod n, then the normalized m-bit value is determined to be equal to the initial m-bit value.

16. A processing unit comprising computing logic configured to convert a normalized n-bit data value which represents one of $2^n$ evenly spaced values within a particular range into a normalized m-bit value which represents one of $2^m$ evenly spaced values within the particular range in accordance with a predetermined rounding mode, the logic comprising:
an initial module configured to:
receive the normalized n-bit data value, and
determine an initial m-bit value such that the bits of said initial m-bit value are equal to the m most significant bits of a concatenation of one or more copies of a group of one or more bits derived from the received normalized n-bit value;
a selection module configured to select an output state based on bits of the normalized n-bit value and in accordance with the predetermined rounding mode, said output state indicating how the normalized m-bit value is to be determined from the initial m-bit value; and
an output module configured to:
determine the normalized m-bit value from the normalized n-bit data value, in accordance with the selected output state, to be equal to one of a plurality of candidate m-bit values, the plurality of candidate m-bit values consisting of the initial m-bit value and at least one of: (i) the initial m-bit value incremented by one, and (ii) the initial m-bit value decremented by one; and
output the determined normalized m-bit value converted from the normalized n-bit value, whereby the data represented by the normalized n-bit data value can be processed in a processor using the normalized m-bit value.

17. The processing unit of claim 16 wherein the selection module comprises a subtractor, and wherein the selection module is configured to select said output state by using the subtractor to determine a sign of the result of a subtraction of the n bits of the normalized n-bit value having r most significant bits and n−r least significant bits from n bits comprising the r most significant bits of the normalized n-bit value appended to the n−r least significant bits of the normalized n-bit value, where r=m mod n.

18. The processing unit of claim 17 wherein the subtractor is an (n−k)-bit subtractor configured to determine the sign of the result of the subtraction, where k is the greatest common divisor of n and m.

19. The processing unit of claim 16 wherein the output module comprises a multiplexer configured to determine the normalized m-bit value, the multiplexer having:
at least two data inputs configured to receive respective candidate m-bit values of the plurality of candidate m-bit values; and
a control input configured to receive an indication of the output state from the selection module, for use in selecting one of the candidate m-bit values to provide as the output from the output module, thereby determining the normalized m-bit value.

20. A non-transitory computer readable storage medium having stored thereon a computer readable dataset description of an integrated circuit that, when processed, causes an integrated circuit manufacturing system to generate a manifestation of computing logic configured to convert a normalized n-bit data value which represents one of $2^n$ evenly spaced values within a particular range into a normalized m-bit value which represents one of $2^m$ evenly spaced values within the particular range in accordance with a predetermined rounding mode by:
receiving at an initial module of the logic the normalized n-bit value;
determining at the initial module an initial m-bit value, wherein the bits of said initial m-bit value are determined to be equal to the m most significant bits of a concatenation of one or more copies of a group of one or more bits derived from the received normalized n-bit value;
based on bits of the normalized n-bit value and in accordance with the predetermined rounding mode, selecting at a selection module an output state indicating how the normalized m-bit value is to be determined from the initial m-bit value;

in accordance with the selected output state, determining at an output module from the normalized n-bit data value the normalized m-bit value to be equal to one of a plurality of candidate m-bit values, the plurality of candidate m-bit values consisting of the initial m-bit value and at least one of: (i) the initial m-bit value incremented by one, and (ii) the initial m-bit value decremented by one; and outputting, from the output module, the determined normalized m-bit value converted from the normalized n-bit value, whereby the data represented by the normalized n-bit data value can be processed in a processor using the normalized m-bit value.

* * * * *